J. G. STEWART.
TIRE CHAIN.
APPLICATION FILED JUNE 24, 1912.

1,042,166.

Patented Oct. 22, 1912.

WITNESSES:
WasHeckman
Fred'k Staub

John G. Stewart INVENTOR
by C. M. Clarke

UNITED STATES PATENT OFFICE.

JOHN G. STEWART, OF VANDERGRIFT, PENNSYLVANIA.

TIRE-CHAIN.

1,042,166.   Specification of Letters Patent.   Patented Oct. 22, 1912.

Application filed June 24, 1912. Serial No. 705,411.

*To all whom it may concern:*

Be it known that I, JOHN G. STEWART, a citizen of the United States, residing at Vandergrift, in the county of Westmoreland and State of Pennsylvania, have invented certain new and useful Improvements in Tire-Chains, of which the following is a specification.

My invention is an improved construction in tire chains for the tires of automobiles and similar vehicles using inflated tires.

It has for its object to provide a gripping tread for the tire composed of chain sections, so arranged as to be easily and readily put on or taken off of the tire and to provide continuous tread members adapted to lie longitudinally along the tread face of the tire and a series of spaced transverse or cross chain sections connected therewith and with the inner retaining chains, together with diagonally arranged stay chains positioned at the points of connection of the ends of the complete structure, adapting it to proper location for operation, constructed in the manner hereinafter more fully described.

Figure 1:
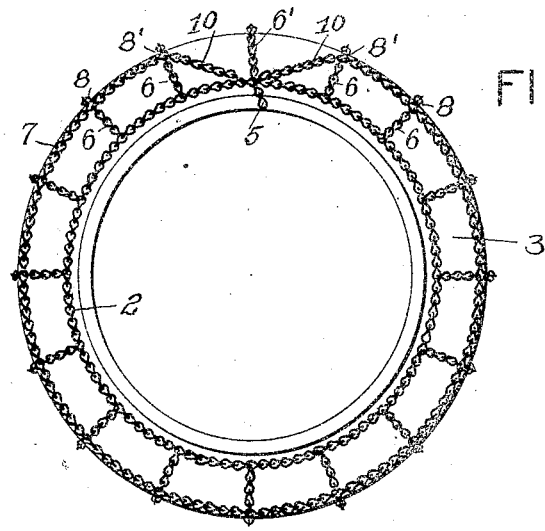
Figures 2, 3:
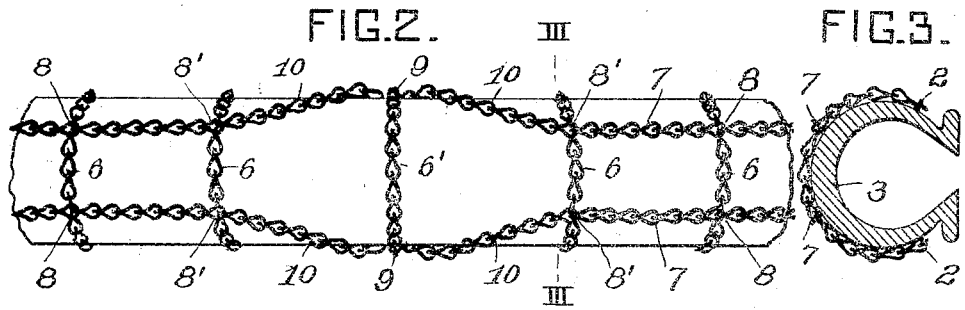
Figure 4:
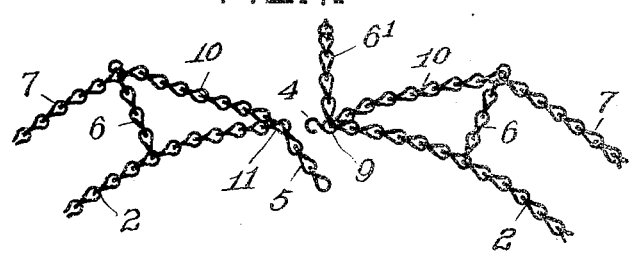

In the drawing—Figure 1 is a view of the device in side elevation as applied to a tire. Fig. 2 is an enlarged plan view of a portion of the structure, showing the stay chains in position. Fig. 3 is a cross section on the line III. III. of Fig. 2. Fig. 4 is a detail view in elevation of those portions of the device illustrated in Fig. 2.

In carrying out my invention I provide two inner annular chain sections 2, 2, adapted to lie around and against the inner portions of the tire 3, said sections being adapted for connection by their ends by means of a terminal hook 4 at one end adapted to interengage with one of the several open links 5 of the other end of said section 2. As illustrated in Fig. 4, a few extra links are provided, whereby to insure engagement of the hook 4 to hold the chains taut, in case of variation of the size of the tire, degree of inflation, etc.

Extending transversely across from one of the chains 2 to the other and spaced at any desired location apart, but near enough to each other to insure frequent successive contact with the road surface, are a series of cross chains 6. Connected with said cross chains at points slightly at each side of the normal annular center of the tire for which the chain is designed are the longitudinal tread chains 7, 7. These tread chains are connected with the cross chains 6 at the point of intersection 8 in each case, by means of an open link or by using the ordinary link of the chain itself whereby to effect a strong durable connection, such construction extending almost completely around the entire tire, the chains 7, so far as their parallelism is concerned, terminating at the points 8' at each side of the cross chain 6'. Such cross chain, as shown, is free and unconnected between its terminal and is connected by such terminals with the inner chain 2 at the point 9. From the points 8' the longitudinal chains 7 are deflected outwardly and downwardly as shown providing the stay chain sections 10, the ends of such stay chains at one side of the meeting point being connected with the side chain and cross chain 6' at the point 9, as shown, the other pair of stay chains 10 being disposed in a similar manner and connected with the other end of inner side chains 2 at 11. The advantage of this construction is that the longitudinal chains 7 are thus firmly anchored at each end to the inner chain 2, thus effecting a continuous maintenance of the holding strain throughout the entire length of chains 7. Likewise, due to the direct connection of chain 7 with the cross chain 6 at the points 8 and 8', the cross chains are similarly maintained in place.

An especial advantage of the structure is in its provision for traction by the cross chains 6 on the road-way in the ordinary travel of the vehicle, and also, in the prevention of skidding by the arrangement of the chains 7, in separated parallelism at each side of the tread center of the tire. Being arranged in such manner, chains 7 are substantially on the same contact level as the face of the tire, especially when slightly flattened, and their arrangement in this manner, in connection with the closely adjacent cross chain 6 and their attachment thereto, provide the continuous series of connected rectangular four-sided chain sections which effectually overcome the disadvantages and dangers for which such devices are usually provided.

It will be understood that the spacing, size, form of link, or other features of the invention may be changed or varied by the skilled mechanic to suit the conditions of use, but all such changes are to be considered as within the scope of the following claims.

What I claim is:

1. A chain grip tread for elastic tires consisting of the combination of a pair of separable annular inner chains having connecting terminals, diagonal stay chains extending backwardly from said terminals at each side toward the crown portion of the tread, circumferentially arranged outer longitudinal tread chains connected with the terminals of said stay chains and disposed annularly parallel with the inner chains, and closely adjacent cross chains connected with said outer longitudinal tread chains and said annular inner chains, substantially as set forth.

2. The combination of inner annular chains having interconnecting terminals, cross chains connecting said chains at intervals, longitudinal tread chains connected with said cross chains providing consecutive series of four sided rectangular chain treads, stay chains connecting the ends of said longitudinal tread chains with the inner annular chains, and a cross chain connected only with the inner chains, substantially as set forth.

In testimony whereof I hereunto affix my signature in the presence of two witnesses.

JOHN G. STEWART.

Witnesses:
J. A. STICKEL,
W. W. ESPY.